United States Patent [19]

Beckenbach

[11] 4,025,293

[45] May 24, 1977

[54] PROCESS AND APPARATUS FOR FIRING AND SINTERING OF GRANULAR MATERIAL

[76] Inventor: Karl Beckenbach, Eschenweg 2, 4005 Meerbusch 1, Germany

[22] Filed: Oct. 14, 1975

[21] Appl. No.: 621,781

[52] U.S. Cl. .................................. 432/5; 432/13; 432/97; 432/101
[51] Int. Cl.² .................. F27D 5/00; F27D 1/08
[58] Field of Search ............ 432/95, 97, 100, 101, 432/13, 14, 16, 5; 214/18 V

[56] References Cited

UNITED STATES PATENTS

| | | | |
|---|---|---|---|
| 1,348,525 | 8/1920 | Ward | 432/97 |
| 1,351,451 | 8/1920 | Ward | 432/97 |
| 3,071,357 | 1/1963 | Blaha | 432/100 |
| 3,499,637 | 3/1970 | Gracher et al. | 432/97 X |

Primary Examiner—John J. Camby
Attorney, Agent, or Firm—Speer and Atwell

[57] ABSTRACT

A process for the firing and sintering of granular material in a gas or oil heated shaft furnace is disclosed in which the material, fed from the top of the furnace passes downwards successively through an entry zone, a preheating zone, a firing zone in which burners are disposed around the furnace wall, and a cooling zone, and in which the feeding of the material at the top of the furnace is so effected that a central depression is maintained in the upper surface of the material in the entry zone, said surface sloping downwardly from the periphery of the entry zone into the central depression, so that segregation of the material occurs automatically, the coarser pieces of material rolling into the central depression, whereby a column of the coarser material is maintained along the vertical axis of the furnace. The feeding of the material at the top of the furnace is effected by means of a charging bell over which the material to be fed to the furnace is discharged, the material being guided by the charging bell to the periphery of the entry zone and then rolling into the central depression below the charging bell.

13 Claims, 12 Drawing Figures

PROCESS AND APPARATUS FOR FIRING AND SINTERING OF GRANULAR MATERIAL

The invention relates to a process for the firing and sintering of material in pieces, such as chalk, dolomite, magnesite, cement or the like, in gas or oil heated shaft furnaces in which the material, fed from a top charging zone, passes successively through an entry zone, a preheating zone, a firing zone, with burners disposed laterally in the furnace wall distributed around the furnace longitudinal axis, and a cooling zone, the coarser pieces of material preferably moving through the furnace inside a central column substantially containing the furnace longitudinal axis, while the finer pieces of material pass through the furnace downwards adjacent its wall; the invention also relates to a shaft furnace for the performance of the process, having a charging zone, an entry zone, a preheating zone, a firing zone, with at least two lateral burner chambers with gas or oil heated burners, disposed distributed in the lower part of the burner zone in the furnace wall around the furnace longitudinal axis, and the cooling zone.

When in a shaft furnace of known kind constructed as described hereinbefore the material for firing is fed from the charging zone without preclassification into the entry zone, the intermixed coarser and finer pieces of material sink downwards substantially uniformly over the whole furnace cross-section. This is a disadvantage since, so that the firing gases and, in the cooling zone the air, can achieve the optimum penetration of the material to be sintered, it is desirable for the coarser pieces of material to move through the shaft furnace as close as possible to the furnace longitudinal axis over its whole length.

East German Pat. Spec. No. 555 81 discloses a process of the kind specified in which the material for firing is preclassified and then the classified material of different grain size is introduced from storage chambers disposed concentrically in the charging zone around the furnace axis along a zonal dividing ring which subdivides the shaft cross-section into a central zone and an edge zone. This process has the disadvantage that the required intermittent distribution of the pieces of material moving through the shaft furnace — i.e., the coarser pieces of material moving through the shaft furnace as close as possible to the furnace longitudinal axis — can be achieved only by an expensive preclassification of the material for firing.

Other prior art shaft furnaces (German Pat. Spec. Nos. 329 170 and 824 178) require relatively complicated charging apparatuses which ensure that the center of the furnace is mainly filled with coarse grained material, while fine grained material slides down adjacent the furnace wall, since in these prior art shaft furnaces also the material to be charged must be demixed and classified before being charged into the shaft furnace, whereafter it must be introduced via difference chutes into the furnace.

It is an object of the invention to develop further the process and shaft furnace of the kind specified, so that without the need for preclassification of the material charged, a suitable distribution of the grain size of the material for firing ensures that the firing gases and the cooling air achieve optimum penetration of the material to be sintered both in the firing zone and the cooling zone.

To this end according to the invention, in a process of the kind specified, when charged in the entry zone the unpreclassified material is so sloped, for the purpose of automatic demixing as regards the size of the individual pieces of material, that a central, stationary depression, into which the coarser pieces of material roll down, is formed in the surface of the material in the zone of the furnace longitudinal axis.

The shaft furnace described hereinbefore for the performance of the process is characterized according to the invention in that the charging zone has a charging ball which covers the central area of the entry zone disposed adjacent the furnace longitudinal axis, guides the material charged in the form of an annular jacket sliding down exclusively adjacent the furnace peripheral wall to the entry zone and slopes the material therein into a central depression.

In other words, the surprisingly simple solution of the problem to which the invention relates is achieved by the suggestion that in the charging zone the material charged is suitably sloped to produce in the entry zone a "pattern" of material is coarse and fine pieces such that there is formed in the zone of the furnace longitudinal axis a column which mainly contains material in coarse pieces. This is achieved by the central, stationary depression into which the coarser pieces of material roll down from the furnace wall during the charging of the material. Such rolling down, which is produced by a considerable slope into the central area of the entry zone and by suitable dimensioning of the charging bell, enables the material to be automatically demixed into relatively fine grained materials sliding down adjacent the furnace wall, and coarse grained material sliding down in the zone of the furnace longitudinal axis, without the need for any complicated classification and charging devices, such as those used in the known processes and shaft furnaces (East German Pat. Spec. No. 55 581, West German Pat. Spec. Nos. 824 178 and 329 170). The resulting distribution of grain size — i.e., the progressive increase in coarse grained material from the furnace wall in the direction of the furnace longitudinal axis — ensures that the firing gases, which emerge from the burner chambers as far as the furnace longitudinal axis and mainly rise at that place, penetrate the material to the optimum extent. This is due on the one hand to the fact that a column of coarse grained material sinks downwards in the furnace longitudinal axis. The tendency of the firing gases to advance as far as the furnace longitudinal axis is further encouraged by the fact that the path followed by the firing gases from the burner chambers as far as the central depression in the surface of the material is shorter at the top end of the entry zone than it is at the furnace walls, so that the firing gases prefer the path adjacent the furnace longitudinal axis and the coarser pieces in the center do not lie compacted but very loosely.

It was quite unpredictable that the extremely simple steps according to the invention would succeed in producing a distribution pattern of the kind described which remains constant over the whole furnace length and ensures that the firing gases emerging from the burner chambers achieve optimum penetration of the material sliding down in the firing zone and the cooling air mainly rising in the zones of coarser material achieves such optimum penetration in the cooling zone also. It is also very important for the distribution of material to remain preserved also in the cooling zone.

As the result also the air will mainly rise in the area occupied by thicker pieces and therefore conveniently become mixed with the firing gas and contribute towards the firing, since it must also be remembered that the thicker pieces of lime require more considerable cooling than the thinner ones. The total result is that the depression and its surroundings contain large pieces of pure material with less flux, the material in the zone of the depression is deposited in a much looser manner than the fine material which is compacted by impinging on the edge zones during charging, and finally the path for the smoke gases to the bottom of the depression in shorter than the path of fine components disposed higher up, so that the gas penetrates the center of the furnace considerably better.

In a preferred embodiment of the process according to the invention, when charged in the entry zone the material is so sloped, for the demixing of the pieces of material of different sizes, that in addition to the central depression there are formed in the surface of the material further depressions which are above the individual burners and into which the coarser pieces of material roll down, so that they move through the furnace mainly inside a central column, substantially containing the furnace longitudinal axis, and other lateral columns, in alignment with the central column of the individual burners, the lateral columns being connected to the central column. Accordingly, a further development of the shaft furnace according to the invention is characterized in that the charging zone has saddles, which project from the furnace wall at a distance below the charging bell and substantially in alignment therewith and with the central column, and further slope the material charged adjacent the furnace wall into depressions adjacent the wall which lie on the lines of alignment of the central column with the burner chambers.

In other words, in this embodiment of the process and shaft furnace according to the invention, as well as the central column of coarse material, there are also formed adjacent the furnace wall further columns which are interconnected and mainly contain coarse material. The other, stationary columns are formed substantially vertically above the burner chambers and are connected to the central column. The lateral columns also contain relatively coarse material, the lateral depressions being somewhat shallower than the central depression. This is as a whole ensures that the coarseness increases continuously from the furnace wall to the furnace longitudinal axis in all the zones of the furnace. The resulting pattern of distribution of coarse and fine material is maintained over the whole length of the furnace.

The flow resistance of the gases therefore also gradually decreases as far as the center of the furnace. This is of considerable importance for the uniformity of the firing operation. It must also be remembered that it is advantageous for all the rock preparation of any factory if demixing of the kind specified — i.e., in accordance with the size of the material — takes place automatically in the shaft furnace and is automatically adapted to the overall grain size bearing in dependence on the quarry and other circumstances.

A preferred embodiment of the shaft furnace according to the invention is also characterized in that grids with grid rods extending from the furnace wall in the direction of the center of the furnace are disposed between the individual saddles. As a result, the zones of fine material disposed between the zones covered by the saddles adjacent the furnace wall are substantially free from coarser pieces of material, so that the material to be sintered is more effectively demixed into sizes than would be possible without the use of the grids.

According to a possible feature of the invention, the distance apart of the neighborhood grid rods adjacent the furnace wall is substantially smaller than at the grid edge disposed towards the center of the furnace; also according to the invention, the grids project radially substantially as far in the direction of the center of the furnace as the saddles. In a further embodiment of the invention, the grids are disposed on the furnace wall substantially at the height of the saddles and extend from that place at an angle downwards in the direction of the center of the furnace.

As a whole the arrangement and construction of the grids according to the invention ensures that the size of the pieces continually increases from the edge of the furnace in the direction of its center, as in the case with a natural slope.

As a whole shaft furnaces according to the invention have proved very serviceable for the improved feed of the firing or smoke gases into the center of the furnace so that adjacent the center of the furnace a large amount of heat is available for the coarser pieces of material, while the remaining firing gases, which rise adjacent the furnace wall, are still adequate to heat the finer pieces at that place, without any risk that the furnace wall will get overheated. However, it has been found that the resultant uniformization of the gas penetration over the whole furnace cross-section still leaves something to be desired, more particularly in the case of furnaces of relatively large diameter. In such shaft furnaces there is also a certain difficulty caused by the fact that the demixing effect can be optimized only for a predetermined grain size distribution of the material to be fired — i.e., the demixing effect can sometimes be excessive, and other times inadequate. In none of these cases is the firing effect uniformized as required over the whole furnace cross-section.

A particularly preferred embodiment of the invention is therefore characterized in that the charging bell has regulating apertures of variable cross-section for controlling the demixing, produced by the sloping of the material, into coarse grained material sliding down adjacent the furnace longitudinal axis and fine grained material sliding down adjacent the furnace peripheral wall. In another possible feature of the invention, the control apertures can be covered by a rotatable covering ring with baffle apertures, steplessly between a completely closed postion and a completely opened position.

The result is always an optimum adjustment of the uniform gas penetration of the material to be sintered over the whole furnace cross-section, independently of a grain size distribution.

This is done by suitably adjusting the opening cross-section of the control apertures to regulate steplessly the required degree of demixing into fine grained materials sliding down adjacent the furnace wall and coarse grained material sliding down in the center of the furnace, so that undemixed charge material drops through the apertures into the charging bell or guide insert directly into the central zone of the furnace adjacent its longitudinal axis, the proportion of material dropping through being steplessly controllable by suitable adjustment of the cross-section of the control apertures.

More particularly for shaft furnaces of larger cross-section, in which otherwise the very large heavy charging bell would have to be used, a further embodiment of the invention has proved very suitable which is characterized in that the charging bell is of relatively small diameter and disposed therebelow is a fixed, frustoconical guide insert whose top edge is disposed at a distance ensuring the lateral removal of the smoke gases below the bottom peripheral edge of the charging bell in its lowered position, the guide insert widening from that place downwards to adjacent the furnace peripheral wall and bearing against the furnace wall, the control apertures being provided in the fixed guide insert.

In this embodiment, therefore, the guide insert partly takes over the function of the wide charging bell in the shaft furnace according to the invention.

As a result, smaller charging bells can be used which do not move the material directly as far as the peripheral wall of the furnace, but only as far as the outer generated surface of the guide insert, which then guides the material for firing as far as the furnace edge. In this embodiment the furnace can be charged up to the upper edge or limit of the insert, so that a slip space filled with material for firing is produced beneath the top space, free from material, of the charging zone.

According to another possible feature of the invention, disposed beneath the charging bell is a hollow cylinder which is open at the bottom and top, is coaxial with the furnace longitudinal axis, and extends in the central depression of the entry zone as far as the top space, free from material, of the charging zone, and whose outside diameter is smaller than that of the charging bell and substantially smaller than the inside diameter of the furnace in the zone of the charging and entry zones. The firing or smoke gases are drawn inwards in the direction of the furnace longitudinal axis, through the hollow cylinder and its chimney work, thus further boosting the guiding of the gases in the inner surface zone. The smoke gases are then discharged through the smoke gas flues leading off from the top space, free from material, of the charging zone.

Figure 1:
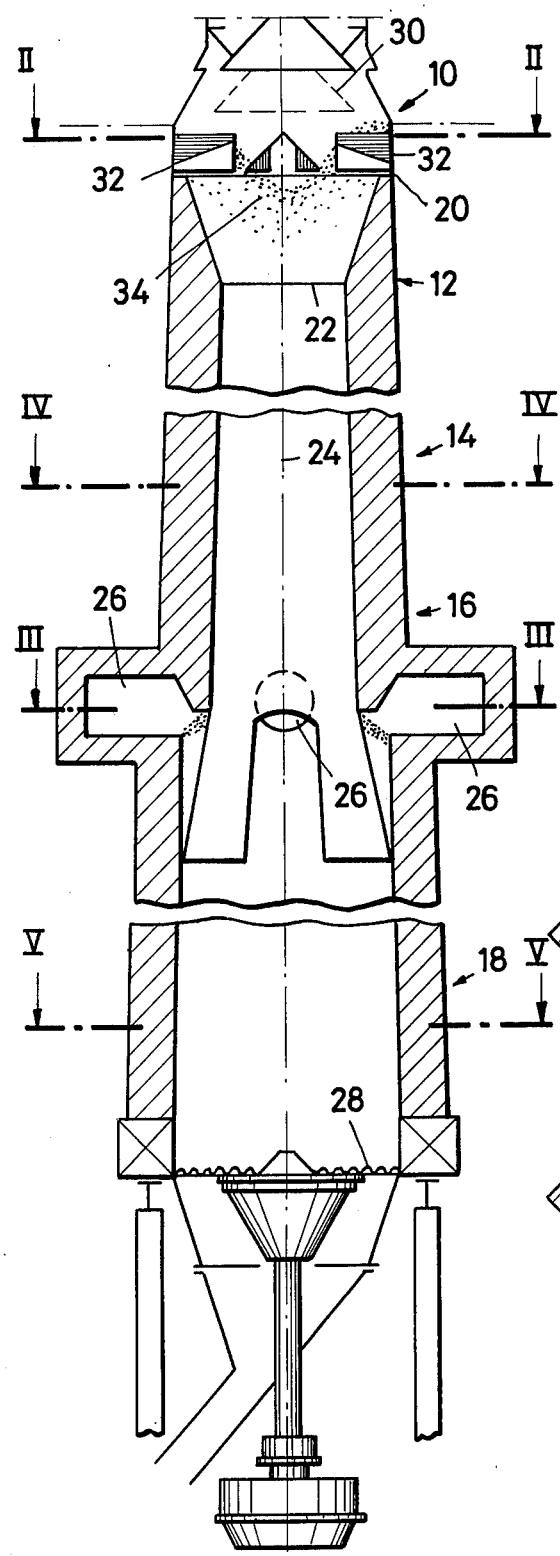
FIG. 1 is a vertical longitudinal section through an embodiment of the shaft furnace according to the invention.
Figure 2:
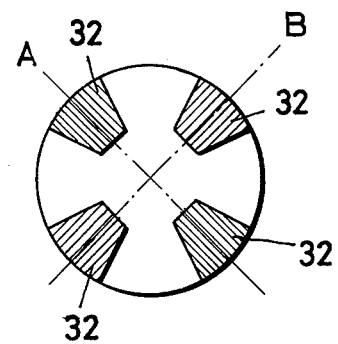
FIG. 2 is a section, taken along the line II—II in FIG. 1.
Figure 3:
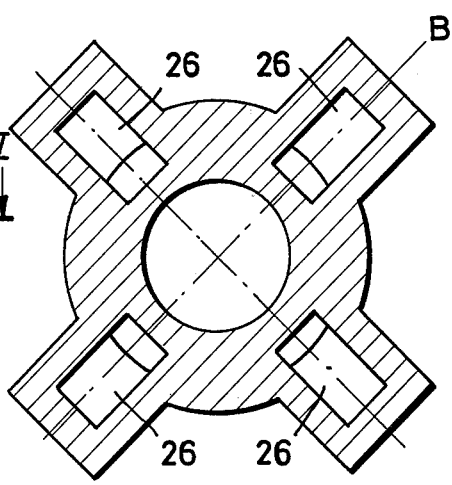
FIG. 3 is a section taken along the line III—III in FIG. 1.

As the drawings show, a shaft furnace according to the invention, which is suitable for the firing, more particularly the burning and sintering of lime, dolomite, magnesite, cement or the like, comprises, adjoining one another in the downward direction, a charging zone 10, an entry zone 12, a preheating zone 14, a firing zone 16 and a cooling zone 18. An entry zone 12 of the shaft furnace, which in the embodiment illustrated has a substantially similar cross-section throughout, although of course other cross-sectional shapes are conceivable, tapers from the top peripheral edge 20 conically downwards to the top peripheral edge 22 of the preheating zone 14, which widens slightly conically from its top peripheral edge 22 in the direction of the firing zone 16. A number of, for instance four burner chambers 26 containing gas or oil fired burners are disposed in the firing zone 16, offset symmetrically around the longitudinal central axis 24 of the shaft furnace. Below the burner chambers the furnace wall is set back in the cooling zone 18 in relation to the firing zone 16, so that the material for sintering can acquire a slope without dropping into the burner chambers. Two or more than the four burner chambers illustrated can of course be provided, in dependence on the size of the furnace. Disposed at the bottom end of the cooling zone is a discharge grid 28 which can be constructed to be movable, for instance in the form of a revolving grate, more particularly for the firing of heavily sintering material, such as magnesite.

As the drawings also show, the shaft furnace is charged through a relatively wide bell 30 which moves the charged raw material as it sinks reliably into the vicinity of the furnace wall, while the zone of the surface of the material disposed around the furnace longitudinal axis 24 is covered by the central portion of the bell. Four saddles 32 are also disposed, in alignment vertically with one of the burner chambers of the central column, in the charging zone above each burner chamber 26. The directions of the diameters of the burner chamber and saddle have the references A, B throughout in the drawings. The shaft furnace according to the invention has a cross-sectional design which makes it difficult for the material to be sintered to stick to the walls, since in such design both the preheating zone 14 and the firing zone 16 and also (in the embodiment illustrated) the cooling zone 18 widen downwards — in the embodiment illustrated conically, due to the substantially circular furnace cross-section, while of course they can so widen in a suitably different configuration if the furnace has some other cross-sectional design. The firing gases, consisting of gas mixed with air, or oil atomized by air, is fed via the burner chambers 26; in the embodiment illustrated the firing gases, and also the cooling air blown in through the discharge grid 28, are removed upwards. The cooling air introduced, which therefore in this embodiment moves upwards through the loosened-up rocks, is used as secondary air for combustion.

The fact that the furnace is charged through the relatively wide bell 30 means that as it sinks the material to be sintered is moved reliably as far as the furnace wall at the top end of the entry zone 12. From the furnace periphery the material becomes sloped, in accordance with the dootted line 34, indicating the surface of the material in the furnace, downwards towards the furnace center, which is of course covered by the central portion of the bell, so that a large depression is formed in the furnace center.

Figure 4:
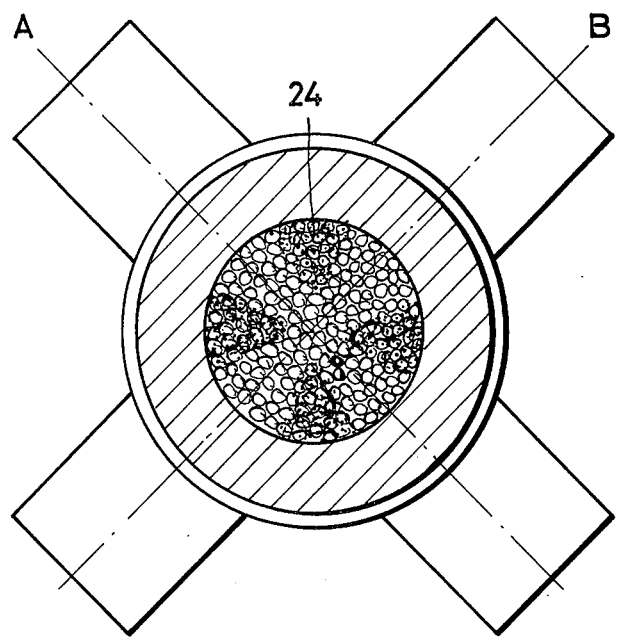
FIG. 4 is a section through the preheating zone, to an enlarged scale, taken along the line IV—IV in FIG. 1.
Figure 5:
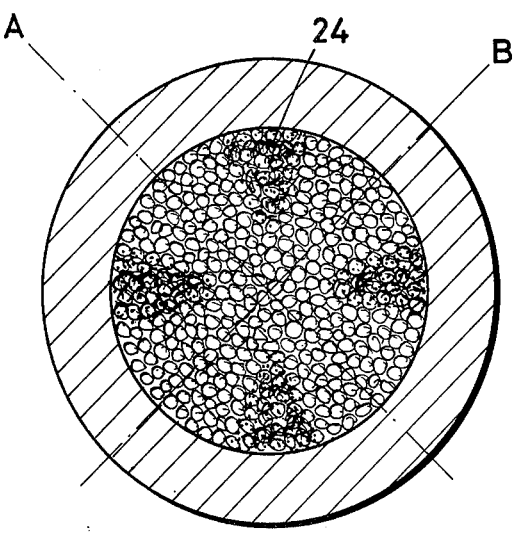
FIG. 5 is a section through the cooling zone, also to an enlarged scale, taken along the line V—V in FIG. 1.

As a whole the arrangement according to the invention of the bell 30 and the saddles 22 produces a demixing of the pieces of material to be sintered, as can be seen particularly clearly in FIGS. 4 and 5. As FIG. 4 shows, the coarser pieces of material collect around the furnace longitudinal axis 24 and along the burner chamber diameters A, B, FIG. 5 showing that the corresponding demixing of the material remains preserved even after it has paased through the preheating and firing zones into the cooling zone 18.

Figure 6:
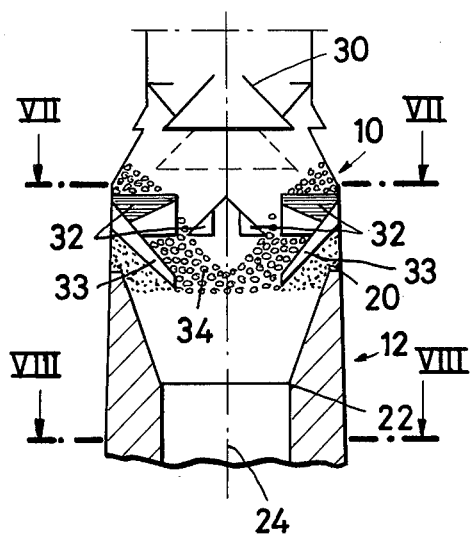
FIG. 6 shows in vertical longitudinal section a portion of a variant embodiment of a shaft furnace according to the invention.
Figure 7:
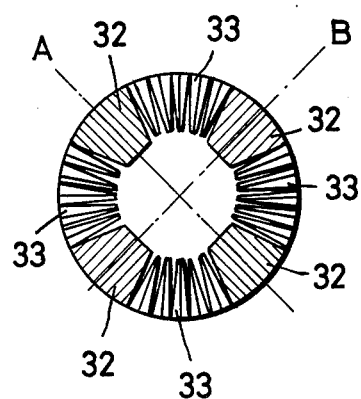
FIG. 7 is a sectional view, taken in the direction of the arrows VII—VII in FIG. 6.
Figure 8:
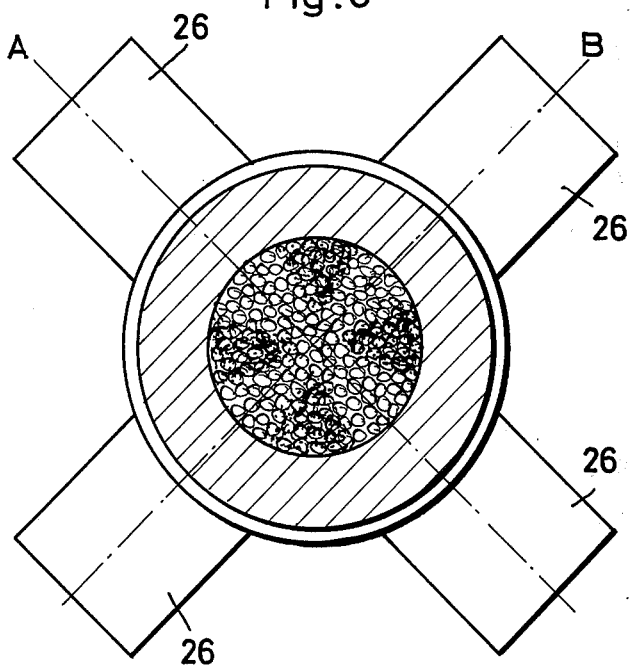
FIG. 8 is a partially diagrammatic section, taken in the direction of the arrows VIII—VIII in FIG. 6.

In the embodiment illustrated in FIGS. 6 to 8, disposed between the saddles are grids 33 which (FIG. 6) extend at an angle downwards in the direction of the furnace longitudinal axis 24 and project radially substantially as far in the direction of the furnace longitudinal axis as the saddles 32. FIG. 7 shows how the distance between the individual grid rods of the gride 33 is larger in the direction of the furnace center than adjacent the furnace wall. The grids ensure that even coarser pieces, which have not yet rolled down to the center into the depression produced by the charging bell 30, are guided towards the center, so that only fine material and material in small pieces is present in the furnace edge zones. This applies even if the furnace, as is normally the case, is filled to such a height that the grids 33 are still inside the poured material — i.e., the fine material drops through the gaps in the grids, while the coarser pieces slide inwards over the grid rods. As already explained, the gaps between the grid rods 33 are such that at the furnace edge the gaps are narrower than towards the furnace center, so that at this place also the size of the pieces continuously increases from the edge to the center of the furnace, as is the case with a natural slope. The grid 33 produce an optimum deflection of the coarser pieces of material into the furnace center, while material in coarse pieces is also disposed at the top of the burner chambers in the manner shown in FIG. 8. This also makes sure that in the zones between the saddles 32 adjacent the peripheral wall there is only very fine grained material, thus further boosting the aforedescribed demixing effect between coarse and fine grained material.

FIGS. 9 to 12 illustrate two embodiments of a further development of the shaft furnace according to the invention. In the embodiment illustrated in FIG. 9 there is disposed beneath the charging bell 30, which can be lowered from the position shown in solid lines into the charging position shown in chaim lines, a hollow cylinder 36 which is coaxial with the longitudinal axis 24 of the furnace and bears via bridges 39 and the saddles 32 against the furnace wall. As illustrated, the hollow cylinder 36 extends from the surface of the material adjacent the furnace longitudinal axis 24 in the transition zone between the entry zone 12 and the charging zone 10 as far as a space 37, free from material, of the charging zone 10, where the cylinder is covered by the charging bell 30 in its lowered position. The charging bell 30 is formed with a number of control apertures 38 which can be covered by a covering 40, formed with baffle apertures 42, between a completely closed position and a completely opened position. Two smoke gas flues 44, 46 extend laterally at an angle upwards out of the charging zone 10.

Figure 10:
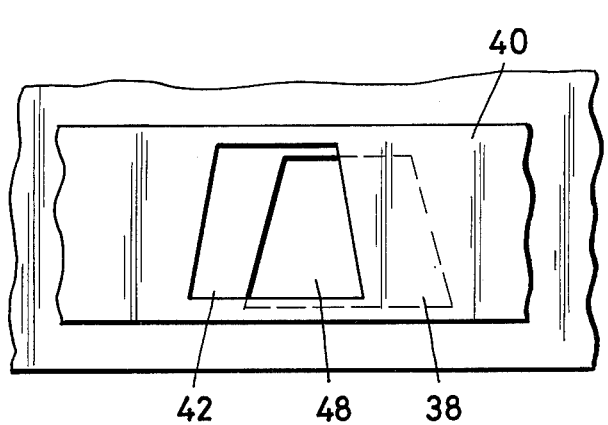
FIG. 10 is a side elevation, to an enlarged scale, of a covering ring used in the shaft furnace illustrated in FIG. 9.
Figure 11:
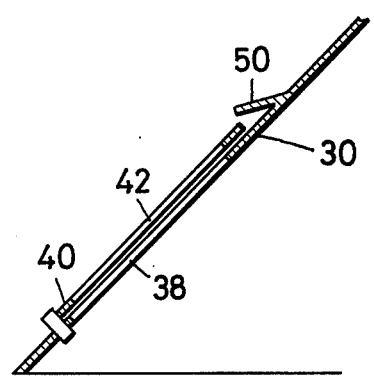
FIG. 11 shows the covering ring construction illustrated in FIG. 10 in section parallel with the furnace longitudinal axis.

FIGS. 10 and 11 clearly illustrate the cooperation of the control apertures 38 with the baffle apertures 42 of the covering ring 40, the free opening cross-section of the control aperture 38 having the reference 48 in FIG. 10. FIG. 11 shows how above the covering ring 40 the charging bell 30 has a screen 50 which prevents pieces of material charged from getting into the gap between the covering ring 40 and the charging bell 30 and thus possibly impeding the free rotatability of the covering or closure ring 40.

Figure 9:
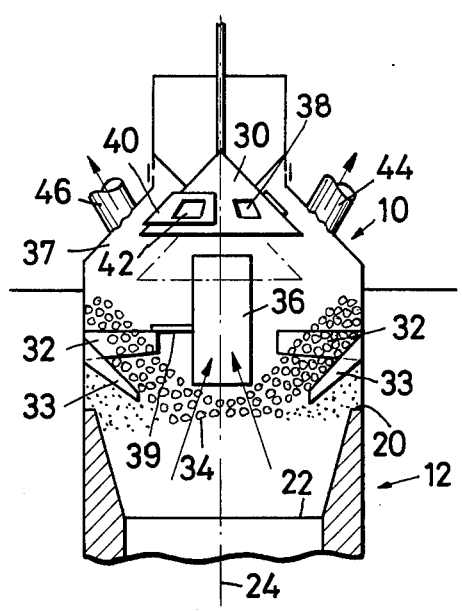
FIG. 9 shows in vertical longitudinal section a portion of another embodiment of a shaft furnace according to the invention.
Figure 12:
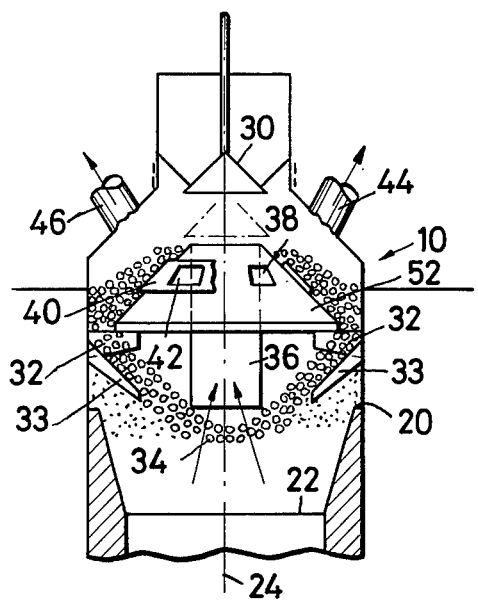
FIG. 12 shows in the same manner as FIG. 9 another embodiment of the shaft furnace according to the invention.

Embodiments illustrated in FIG. 12 differs from that illustrated in FIGS. 9 to 11 only by the feature that as illustrated in FIG. 12 the hollow cylinder 36 does not bear directly via the bridges 39 and saddles 32 (FIG. 9) against the furnace wall, but is enclosed by a frustoconical, bell-like guide insert 52 which widens from the top end of the hollow cylinder 36 downwards to the vicinity of the furnace wall. In the embodiment illustrated in FIG. 12 the charging bell is relatively small and has no control apertures 38 with control ring 40. Instead, the control apertures 38 at the covering ring 40 with the baffle apertures 42, which for the rest of the same function as in the embodiment illustrated in FIG. 9, as will be explained hereinafter, are provided in the guide insert 52, the rest of the construction being similar to the details illustrated in FIGS. 10 and 11. This embodiment of the shaft furnace according to the invention operates as follows:

In the manner already described, the charging bell 30 (or the charging bell 30 cooperating with the guide insert 52 in the embodiment illustrated in FIG. 12), the saddles 32 and the grids 33 produce a demixing of the material for firing into coarse grained material sliding down adjacent the furnace center and fine grained material moving through the furnace adjacent its wall. The control apertures 38 in the charging bell (FIG. 9), which can be closed partly or completely as required by the covering ring 40, also enable the degree of demixing to be controlled in dependence on the grain size of the material supplied. In other words, the amount of desired demixing of the pieces of material into coarser pieces which move through the furnace adjacent its longitudinal axis and the finer pieces sliding down adjacent the furnace walls can be controlled by allowing undemixed material charged to be dropped directly into the furnace center in a controlled manner through the control apertures 38.

In the embodiment illustrated in FIG. 12, which is more particularly suitable for shaft furnaces of relatively large diameter, the function of the charging bell 30 illustrated in FIG. 9 is partly taken over by the guide insert 52. In the embodiment illustrated in FIG. 4, the charging bell 30 is relatively small and does not bring the material charged, as in the embodiment illustrated in FIG. 9, as far as the furnace edge, but merely guides the material on to the generated surface of the guide insert 52, which only then deflects the coarser pieces of material to the furnace center. The control apertures 38, which can be partly or completely covered by the covering ring 40 formed with baffle apertures 42, also enable the degree of demixing to be controlled in dependence on grain size in the manner described hereinbefore in the embodiment illustrated in FIG. 4. The guide insert 52 used in the embodiment illustrated in FIG. 12 also enables the charging zone to be filled with material up to the upper limit of the guide insert 52, so that a silo space filled with material can be produced around the guide insert 52.

In both embodiments the effect of the hollow cylinder 36 is that the smoke gases are drawn off, as shown by the arrows, from the central depression of the surface 34 of the material, adjacent the furnace longitudinal axis 24, and are then removed from the shaft furnace through the smoke gas flues 44, 46 also in the direction shown by the arrows. This method of conducting the smoke gases further boosts the tendency of the firing gases to rise mainly adjacent the furnace longitudinal axis 24, but not in those zones of the material which are disposed adjacent the furnace peripheral wall and in which for compensation the finer grained material slides down towards the furnace center. This is of the greatest importance for the optimum uniform penetration of the material to be sintered by the firing or smoke gases.

Taken together, the arrangement according to the invention of the charging bell 30, saddles 32, grids 33, control apertures 38, guide insert 52 and hollow cylinder 36 mean that they boost one another and if necessary, in the various embodiments, cooperate to demix the material in pieces to be sintered, as shown very clearly in FIG. 8, such demixing ensuring the optimum uniform penetration of the material to be sintered, by the rising firing or smoke gases over the whole furnace cross-section.

The features of the invention disclosed in the foregoing description in the drawings and the following claims may be essential both individually and in any combination to put the various embodiments of the invention into effect.

I claim:

1. A process for the firing and sintering of unpreclassified material pieces such as chalk, dolomite, magnesite, cement or the like, in a gas or oil heated shaft furnace, comprising the steps of:
providing the furnace with a plurality of downwardly vertically successive zones including a charging zone, an entry zone, a pre-heating zone, a firing zone and a cooling zone;
feeding the material from the top charging zone and successively through the remainder of said plurality of zones provided in said furnace,
adapting the furnace to have a plurality of radially outwardly disposed burners above the cooling zone;
providing flow effecting means, generally above the entry zone, for achieving a material-size separation following feeding of the material at the charging zone, whereby the surface of the material moving from the charging zone to the entry zone forms a central depression in which relatively coarse pieces of the material pass into the depression and centrally downwardly generally along the furnace longitudinal axis as a central flow column while relatively fine pieces of the material progress downwardly in a vertical pathway located away from the furnace longitudinal axis.

2. The process of claim 1 comprising the further step of adapting said flow effecting means to cause a plurality of depressions in the surface of the material moving to the entry zone radially outwardly from the central depression whereby lateral flow columns of coarse material are formed as lateral radial extensions of the central column.

3. A shaft furnace for firing and sintering of material pieces such as chalk, dolomite, magnesite, cement or the like, comprising a vertically elongated substantially tubular structures defining, in a vertically successive downward arrangement, a charging zone, an entry zone, a pre-heating zone, a firing zone and a cooling zone, a plurality of laterally disposed burner chambers in the lower part of the burner zone supporting burners therein for firing of material fed through the furnace, the charging zone having means disposed adjacent the furnace longitudinal axis and centrally above the entry zone, and adapted to guide the flow of material charged whereby the material follows an annular configuration which passes adjacent the furnace peripheral wall through the entry zone and slopes downwardly inwardly in the entry zone in a central depression formation.

4. The shaft furnace of claim 3 wherein the means for guiding the charged material is a charging bell assembly located to block central entry of charged material in the charging zone.

5. The shaft furnace of claim 4 further comprising saddles located in the charging zone and projecting from the furnace wall at a distance below the charging bell, and each of the saddles being adapted to further slope the material charged adjacent the furnace wall into depressions adjacent the wall.

6. The shaft furnace of claim 3 wherein the entry zone has its top peripheral edge a larger cross-section than the subjacent pre-heating zone, the entry zone tapers conically from its top peripheral edge to the top peripheral edge of the pre-heating zone, and the pre-heating zone conically widens from its top peripheral edge to the subjacent firing zone, and the firing zone also widens conically downwards.

7. The shaft furnace of claim 6 wherein the furnace wall immediately below the burner chambers is a widened wall area as compared to the wall area defining the firing zone thereabove, and the cooling zone is disposed below the widened wall area and is shaped to taper downwardly outwardly toward the discharge end of the furnace.

8. The shaft furnace of claim 5 further including grids disposed each between pairs of the saddles, and the grids comprising grid rods projecting inwardly from the furnace wall in the direction of the furnace center.

9. The shaft furnace of claim 8 wherein the grid rods taper toward the furnace center such that the distance between adjacent grid rods is substantially less near the furnace wall and widens gradually toward the inward end projection of the grids.

10. The shaft furnace of claim 8 wherein the distance of projection of the grids from the furnace wall is substantially the same as the distance of projection of the saddles.

11. The shaft furnace of claim 8 wherein the grids are disposed to project from the furnace wall substantially at the same level as the saddles and the grids are disposed to angle slightly downwardly in the direction of their projection toward the furnace center.

12. The shaft furnace of claim 4 wherein the charging bell assembly includes a charging bell with regulating apertures of variable cross-section therein for effecting and controlling internal demixing and material size separation within the furnace in accordance with grain size of the material.

13. The shaft furnace of claim 12 wherein the charging bell assembly includes a rotatable covering on the charging bell with baffle apertures adapted to coact with the regulating apertures whereby the regulating apertures can be infinitely variably positioned between completely closed and completely opened positions.

* * * * *